United States Patent [19]
Sable

[11] 3,797,933
[45] Mar. 19, 1974

[54] APPARATUS FOR MAKING COLOR ENLARGEMENTS

[75] Inventor: Arthur J. Sable, Tall Timbers, Colo.

[73] Assignee: Sable Photo Works, Inc., Tall Timbers, Colo.

[22] Filed: Feb. 3, 1972

[21] Appl. No.: 223,081

[52] U.S. Cl. .................................. 355/35, 355/77
[51] Int. Cl. ............................................ G03b 27/76
[58] Field of Search ......................... 355/38, 77, 35

[56] References Cited
UNITED STATES PATENTS

| | | | |
|---|---|---|---|
| 3,184,307 | 5/1965 | Letzer | 355/38 X |
| 3,640,620 | 2/1972 | Shatz | 355/38 |
| 3,678,823 | 7/1972 | Sato | 95/10 CT |
| 3,229,569 | 1/1966 | Frost et al. | 355/38 |
| 3,585,029 | 6/1971 | Neale | 355/38 |
| 3,220,304 | 11/1965 | Clapp | 355/38 |

Primary Examiner—Samuel S. Matthews
Assistant Examiner—Richard A. Wintercorn
Attorney, Agent, or Firm—Edwards, Sprangler, Wymore & Klaas

[57] ABSTRACT

This invention involves a system for making color enlargements from a transparency, either positive or negative, wherein a color analyzer light beneath a transparent window in the base is used to compare the relative intensities of the red, blue and green light contained in a diffused image transmitted by an unknown transparency with the predetermined intensities of these same colors of light transmitted by a preselected reference transparency in order to determine the relative color balance therebetween. The overall exposure time found necessary to produce an acceptable print at the chosen aperture and degree of image magnification is then determined through further comparison with the preselected reference transparency and this information is coupled with the ratio of relative intensities to arrive at red, blue and green exposure intervals which are separately though simultaneously timed. Two filters are mounted for independent movement into the path of the projected image, the first being of a hue selected to block the color of light selected from the above group already known to require the shortest exposure time, and the second being of a hue selected from the remaining two colors adapted to block that color previously found to require the next shortest exposure time. Control circuitry operatively interconnects the timing and filter actuating mechanisms so as to automatically time the exposures in accordance with the predetermined and preset schedule. In doing so, the circuit functions upon actuation to turn on the enlarger lamp and initiate all three time intervals. Next, it automatically extends the first filter into its extended operative position when the shortest of the three color exposure intervals times out and then it extends the second filter into operative position when the next shortest predetermined color exposure interval times out. Finally, the control circuit becomes operative to shut off the enlarger lamp when the predetermined overall exposure time expires thus terminating the last and longest of the three exposures. The unique combination of subassemblies which cooperate with one another to carry out the foregoing novel procedure together with the procedure itself constitute the subject matter hereof.

14 Claims, 6 Drawing Figures

PATENTED MAR 19 1974 3,797,933

APPARATUS FOR MAKING COLOR ENLARGEMENTS

It is, of course, a well known technique to make a full color photographic pint by passing white line through a transparency, either in the form of a color positive or negative, onto the emultsion-coated surface of a positive print-making color positive or negative, onto the emulsion-coated surface of a positive print-making material. The white light is modified upon being passed through the transparent image on the transparency so as to produce exposures on three separate superimposed color-sensitive emulsion layers coating the positive material. After development, the redsensitive layer produces a cyan image, the gree-sensitive layer a magneta one and the blue-sensitive layer a yelllow image. When viewed in superimposed registered relation, these three images combine to produce a single image in colors substantially identical to that of the original subject provided the correct exposures were used for each of the three colors in he composite. In my copending application Ser. No. 251,051, filed May 8, 1972, I have disclosed one particular novel method and apparatus for determining these exposures correctly; however, he present application is not concerned so much with how the exposure parameters are determined, but instead, with a system that includes some such means for supplying this information.

For purposes of the present description, it can be assumed that the three emulsion layers on the print material are exposed selectively of light of three different hues, namely, red, green and blue. Now, in one such method commonly known as the "white-light method" these three exposures occur simultaneously and all of them are of the same duration. The correct balance among the three necessary to produce a print which accurately depicts the original subject is, therefore, achieved by selective filtration. In other words, by attenuating the light of each color to the proper degree relative to the other two, the necessary ratio of intensities for an exposure of like duration can be achieved. A cyan filter will, for example, attenuate only the red component of white light and its density will govern the degree of attenuation. Similarly, a magenta filter will attenuate the green light and a yellow filter the blue. This technique of using subtractive filters of selectable density in the light path is quite a popular one employed in most of the color enlargers used by all but large-volume automated commercial processors.

As one might expect, the other system, which is commonly known as the "additive method", brings about the required color balance by varying the duration of the exposures rather than their intensity. This can be done in two different ways, the first of which, obviously, is to expose each color separately and consecutively. The second technique involves overlapping the exposures by connecting all three together but terminating them at different times.

Now, as previously mentioned, most photographic enlargers use the subtractive method and it takes the form of filters of different density that are built into the lamp housing. Such a system and its method of use leave much to be desired and, as a result, the making of color enlargements is largely left to the commerical processing laboratory. The resons for this are severalfold, most of them having to do with either the expense or the somewhat unsatisfactory results.

Looking first at the expense involved, there are not more than half a dozen or so color enlargers available on the market today and the two or three high quality ones all sell for several hundred dollars. When one adds to this the cost of a comparable quality exposure analyzer for color work and an accurate timer, the overall expense can easily run as much as $1000 or even more. On the other hand, the same equipment of a quality suitable for processing black and white prints can be had for considerably less. From the foregoing it should be apparent that a long-felt need exists for a color enlarging system capable of making good-quality color prints which can sell for substantially less than those currently available.

From the standpoint of print quality, any reliable assessment must be based not only upon the enlarger alone but the exposure analyzer and timer as well because each depends upon the other and the resultant print is only as good as the weakest of the three. For example, a timer having $\pm 1$ sec. accuracy is really not good enough for quality work and equipment approaching $\pm 0.1$ sec. or better is needed.

The same is true of the exposure analyzer because it determines the color balance present in the transparency and the degree of filtration necessary to reproduce the subject depicted thereby accurately in the final print. Unfortunately, the margin of error is small in this operation and such as do occur are most noticable. In fact, the techniques and equipment presently available for determining the proper exposure for a color print generally fall short of the companion enlarging and timing equipment in terms of their respective capabilities. This is probably due in large measure to the relatively greater complexity of the analyzer and the fact that many of them require a subjective determination on the part of the use which introduces a certain amount of human error.

The enlarger itself, while generally easy to operate once the proper filtration values are known, is not particularly accurate, at least not as accurate as a print exposure technique based upon the additive system would be. The reason for this is obvious when one considers the fact that a variation in time differentials of a few percent and less is easily handled while this same magnitude of relative density in the filters presents serious problems.

Accordingly, there exists a need for a moderately-priced system for making color photographic prints, particularly enlargements, because the user of small transparency formats makes contact prints impractical. Preferably, such a system would combine the transparency analyzing, enlarging the timing functions in a single piece of equipment wherein the three functions were carefully designed to integrate well with one another. Because of the greater accuracy inherent in the additive system, it is to be preferred over the subtractive one found in most commercially-available enlargers found in the current retail market.

In addition, the procedures used with such equipment should be relatively simple and as free as possible of operations requiring subjective decisions to be made by the user. The method should produce consistent results over a wide range of color values depicted in the subject matter of the transparencies. Once properly calibrated, both the apparatus and method must cooperate to give reproducible results.

Finally, the system should be multi-purpose in that it can function equally well for both color and black-and-white work. Along this same line, a properly-designed system should provide ample opportunity for the user to override the indicated exposures both to create special effects and to compensate for the unusual transparency.

It has now been found in accordance with the teaching of the instant invention that such a color print-making system can, in fact, be developed based upon the additive exposure method and incorporting the analytical as well as the functional components in the same piece of equipment. Most important, such equipment can be made to retail for considerably less than a system built up from several separate and distinct components yet phase results comparable in every respect to that produced by such systems.

The print-making method upon which the equipment is based and with which it is used is simple, yet quite accurate and capable of giving excellent results. Even though the system is designed to function without making judgement decisions of any consequence, it can be overridden at any stage by the user and placed under his complete control.

Accordingly, it is the principal object of the present invention to provide a novel and improved method and apparatus for making color photographic enlargements.

A second objective is the provision of apparatus of the type aforementioned which combines in a single unitary structure the analyzing, exposing and timing functions.

Another object of the within-described invention is to provide a print-making system based upon the additive method.

Still another objective of the invention herein described and claimed is to provide a single piece of color enlarging equipment that will produce results comparable in every way with that obtained through the use of several pieces of commercially-available equipment whose combined cost is several times greater.

An additional object is to provide a piece of precision photographic equipment and method of using same that is nearly foolproof in terms of determining a correct exposure and then making it.

Further objects of the invention are to provide a system for making color prints that is simple to use yet versatile, one that can be readily adapted to any of the commonly-used photo-sensitive materials, a unit that consistently produces work of equally good and sometimes better quality than that of many prior art systems, and one that handles both negative and positive transparencies with equally good results.

Other objects will be in part apparent and in part pointed out specifically hereinafter in connection with the description of the drawings that follows, and in which.

Figure 1:
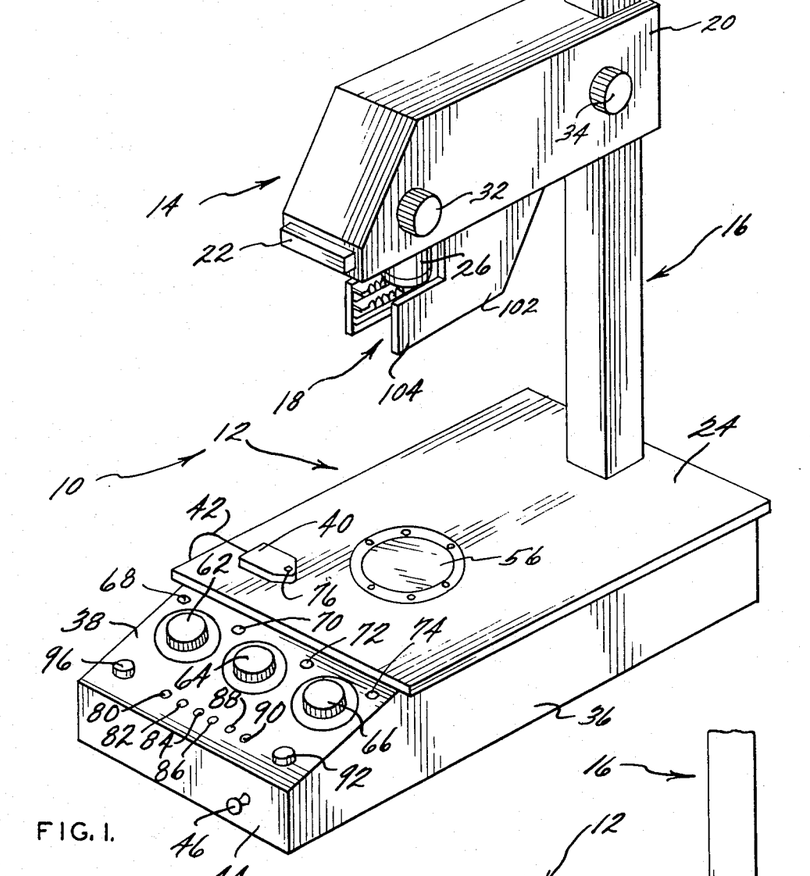
FIG. 1 is a perspective view looking down and to the left upon the enlarger of the present invention.

Referring next to the drawings for a detailed description of the present invention and, initially, to FIG. 1 for this purpose, reference numeral 10 has been selected to designate the color enlarging apparatus in its entirety while numerals 12 14 and 16 have been chosen to similarly designate the base, head and post by means of which the spacing between the latter and the former is adjusted. The enlarger head 14 is of conventional design except for the filter subassembly 18 carried thereby that will be described in detail presently in connection with FIGS. 3 and 4. Head 14 includes a light-tight lamp housing 20 containing a source of illumination which preferably takes the form of a tungsten-halogen lamp which has the advantage of maintaining a nearly constant light output of uniform color over its entire life. The housing will be ventilated and may even include a fan although one constructed in accordance with the teachings of the instant invention doesn't need one because its utilization of the light is so efficient that the small wattage bulb generating little heat is all that is needed.

A negative carrier 22 is detachably mounted in the housing in position sych that the light emitted from the source of illumination will pass therethrough and produce a focused image on the upwardly-facing supporting surface or baseboard 24 of the base 12 with the aid of lens 26. Lens 26 is, likewise, of conventional design and includes an adjustable diaphragm (not shown) calibrated in f-stops 28 engraved on the barrel which are matched up with an index mark 30 on the actuating ring, all of which is revealed most clearly in FIG. 3 to which reference will be made shortly. Focusing knob 32 on the side of the lamp housing is operatively coupled to the lens and functions upon manual actuation to move same up and down relative to the transparency so as to reproduce a focused image thereof on the baseboard at the degree of magnification determined by the height of the head 14 above the base 12. The latter adjustment is made by means of a second control knob 34 which operatively connects the head to the post or column 16.

Up to this point the head is entirely conventional and no attempt has been made to describe its various features in detail because the heads found on most all photographic enlargers include these selfsame features in one form or another and they could, for this reasons, be substituted for the head shown without the exercise of invention. The same thing is true of the part or column 16 used to support the head for adjustable movement relative to the base. In fact, column 16 could, if desired, take the form of a wall-mounted track left unattached to the base but still functioning to support the head for relative movement toward and away from the latter. Base 12, on the other hand, is decidedly unconventional as will become apparent presently in connection with the description of FIG. 2 which follows.

Figure 2:
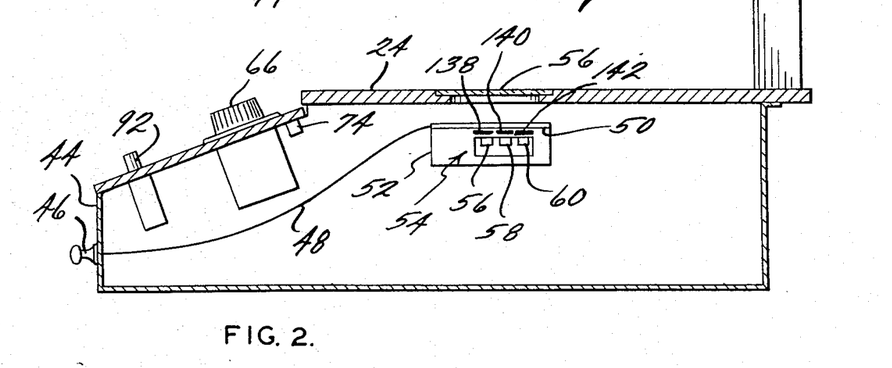
FIG. 2 is a longitudinal section through the base.

Referring next to FIGS. 1 and 2, it will immedagely become paarent that the base 12 comprises a good deal more than a flat upwardly-facing supporting plateform 24 suitable for carrying an easel (nto shown) of the type into which a sheet of photographic print paper is inserted and held while being exposed. To begin with, the upwardly-facing supporting surface 24 comprises in the particular embodiment of the invention illustrated herein, a cover for a box-like equipment cabinet 36. An inclined control panel 38 slopes downwardly toward the operator from the front edge of the supporting surface or baseboard 24 and it carries a series of control knobs and switches, the specific identity and function of which will be set forth later in connection with a detailed analysis of the control and analyzer circuits of FIGS. 5 and 6. A movable exposure probe 40 attached to the exposure analysis circuitry inside the cabinet by means of "pigtail" lead 42 is shown resting atop the baseboard where it can be positioned by the operator at any point on the projected image. In the particular form shown, the front panel 44 of the equipment cabinet will be seen to carry the push-pull knob 46 of flexible cable 48 that is attached to the lid 50 of a small box 52 containing a color probe subassembly that has been broadly designated by reference numeral 54. This box and associated lid are located directly beneath transparent window 56 in the baseboard 24 of the base 12 as shown in FIG. 2. While not absolutely necessary, the function of lid 50 is to protect the photoresistors 56, 58 and 60 of the color probe 54 from being temporarily blinded by strong room light in the darkroom that might otherwise cause erroneous readings. Thus, push-pull knob 46 is used as a means for remotely actuating lid 50 so as to remove same from box 52 thus exposing the photo-resistors of the color probe to the comparatively dim projected image on the baseboard when the time comes to compare the relative intensities of the red, blue and green light passed by an unknown transparency in the negative carrier with that transmitted by a preselected and previously-calibrated reference transparency. In many instances, the maximum intensity of the ambient room light or light from the source of illumination in the enlarger head directed thereon, or both, is insufficient to blind the photo-resistors of the color probe to any appreciable extent in which event the removable shield just described can be eliminated along with the remote control mechanism therefor.

Before leaving FIGS. 1 and 2, it will be helpful to explain the various controls available to the operator on the front of the control panel even through some of these same elements will be described in greater detail in connection with FIGS. 5 and 6. The three larger dials are color exposure timer dials used to set the predetermined exposure time intervals into the timers 62, 64 and 66 associated therewith. For purposes of illustration, timer 62 on the left times the red exposure, timer 64 in the center the green, and timer 66 on the right the blue exposure. is Shown above these three dials is a bank of four adjustable calibration resistors that have been given identifying numerals 68, 70, 72 and 74. Variable resistor 68 matches up with red-filtered photo-resistor 56 in the analyzer circuit of FIG. 6, whereas, variable resistors 70 and 72 match up with the blue and green filtered photo-resistors 58 and 60, respectively. Variable resistor 74, on the other hand, matches unfiltered photo-resistor 76 of the exposure probe 40.

Shown beneath these three timer dials is a six-button switch that has been broadly designated by reference numeral 78 and which includes push-buttons numbered 80 through 90, inclusive. Push-button 80 energizes the timer circuit of FIG. 5 through start switch 92 located in the lower righthand corner of the control panel. Push-button 82 is an alternate contact of the FIG. 5 timer circuit that by-passes the three timers and start switch 92 to directly energize enlarger lamp 94 for focusing purposes and the like.

Figure 6:
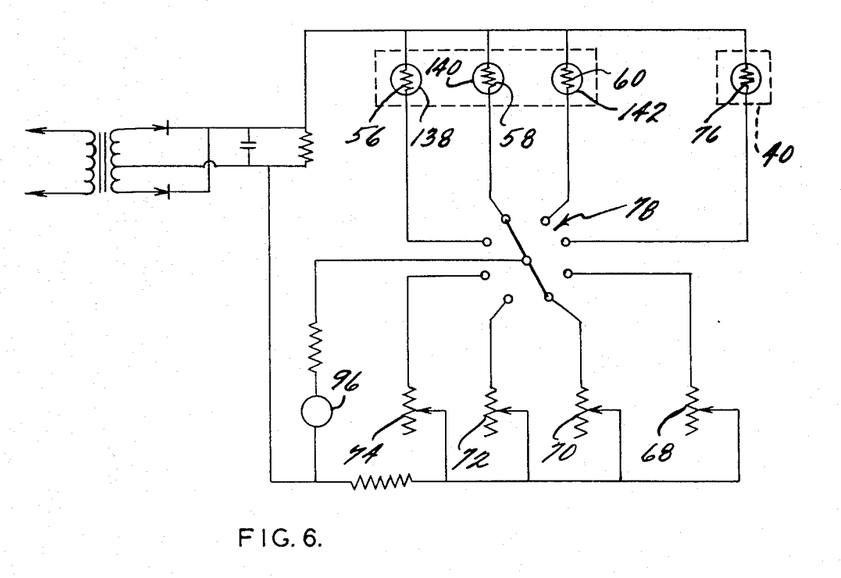

The remaining contacts of this switch selectively interconnect the four photo-resistors 56, 58, 60 and 76 with their calibrated variable resistors 68, 70, 72 and 74, respectively in accordance with the FIG. 6 circuit.

Element 96 in the lower left hand corner of the particular control panel illustrated herein comprises the neon indicator bulb of the analyzer circuit shown in FIG. 6. This bulb responds by extinguishing when the intensity of the light striking each of the photo-resistors causes it to assume a value of resistance which matches the preset resistance value of the paired variable resistor as determined from the preselected reference transparency. Please note that the term "match" as used throughout the specification and claims and in the preceding sentence is intended to signify that point at which the light, colored or unfiltered, transmitted by an unknown transparency bears some predetermined relationship to the same kind of light transmitted by the preselected reference transparency rather than some numerical idenity therebetween such as the voltage drop across their paired photo-resistors.

Next, with reference to FIGS. 3 and 4, the filter subassembly 18 will be described in detail. Suspended beneath the enlarger head for movement therewith relative to the base is the filter subassembly that includes a frame 102 having arm-forming portions 104 projecting horizontally in transversely-spaced parallel relation to one another forwardly along opposite sides of the lens 26 from a position to the rear thereof. The opposed faces of the arms 104 along with the portion of the frame 102 from which they depend carry a series of three superimposed sets of parallel tracks 106, 108 and 110. The lower of these tracks 106 mounts a diffusion filter 112 for slidable movement from a retracted inoperative position at the rear thereof to an extended operative position beneath the lens 26. Movement of this diffusion filter in the particular embodiment illustrated is accomplished manually by the operator by grasping downturned handle 114.

The upper two tracks 108 and 110 house color filters 116 and 118, respectively, for movement between retracted and extended positions in the path of the light passing through lens 26. In the case of the latter filters, on the other hand, they are normally biased into extended position by tension springs 120 attached to brackets 122 extending transversely along the trailing edges thereof. These springs are mounted above the tracks in which their respective filters slide and they are dead-ended at the front end of the forwardly-projecting arms 104. Brackets 120 are formed from soft magnetic material and are attracted and held in retracted position by a pair of permanent magnets 124 of sufficient strength to overbalance the spring force biasing same into extended position.

Figure 3:
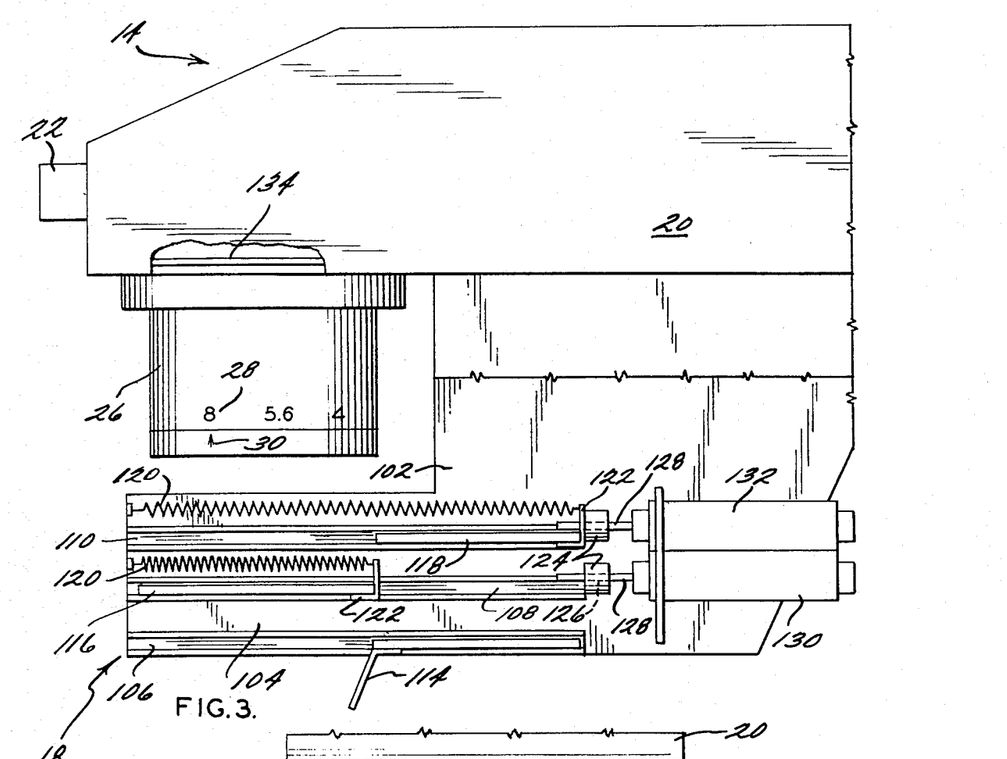
FIG. 3 is a fragmentary view of the head, partly in section and partly in elevation, detailing the filter mechanism to an enlarged scale.
Figure 4:
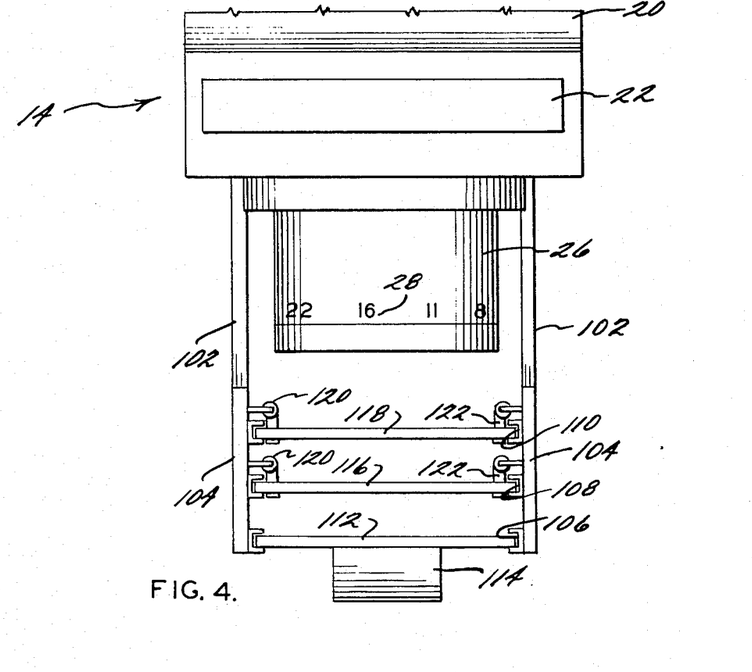
FIG. 4 is a fragmentary front elevation of the head to the same scale as FIG. 3.

In the particular form shown in FIG. 3, magnets 124 have passages 125 therethrough adapted to receive the push-rods 128 of push-type solenoids 130 and 132 mounted at the rear of tracks 108 and 110 in position to extend said rods forwardly upon actuation. The leading ends of these push rods engage the brackets 122 along the trailing edges of the filters and push the latter away from the magnets 124 a distance sufficient to reduce the magnetic pull thereon to a level less than that exerted by springs 120. Of course, when this occurs, the filters will spring immediately forward into their extended operative positions.

In the preferred embodiment of the invention illustrated herein, only two color filters 116 and 118 are used, one magenta and the other yellow. To do this, the red exposure must always be the longest of the three and this is usually the case when a tungsten-halogen lamp 88 is used in the enlarger head because, even though the red component of the white light produced thereby is of greater intensity than either the green or blue, the actinic effect produced by the red component thereof upon the usual color print material emulsions is such that the red component requires the longest exposure. If one wishes to further insure the fact that one color light is always going to be weaker than the other two, this is simply done by inserting a cyan, magneta or yellow filter 134 in the path of the light reaching the baseboard such as, for example, in the lamp housing above the lens. Filter 134 has as its sole function the reduction in the intensity of one of the three colors of light so that it will always require the longest exposure. It has been found that selection of an enlarging lamp with the proper color spectrum eliminates the need for filter 134. Obviously, from what has been said above, one could, without the exercise of invention, easily design the system such that either the blue or green exposure is the longest instead of the red.

The function of the diffuser 114 is to mix the light transmitted by an unknown color transparency in the negative carrier 22 preparatory to analyzing same by comparing the intensities of its red, blue and green light with that transmitted by a preselected reference transparency. Diffuser 114 is usually made of ground glass or some other type of frosted material and its use is preferred, but not essential, because merely throwing the projected image badly out of focus will often suffice to give good integrated color. Having made the above comparison and determined therefrom the relative exposure times for the red, blue and green light, one must then decide upon an overall or total exposure time that will produce a satisfactory print at a given lens aperture and degree of image magnification. Such a color and overall exposure analyzer has been illustrated in FIG. 6 to which brief reference will now be made even though it forms the subject matter of my copending application for U.S. Letters Patent Serial No. 251,051, filed May 8, 1972. It is included here as being merely representative of a group of such exposure analyzers, any one of which could be used with the apparatus of the present invention to analyze an unknown color transparency and make a color enlargement therefrom.

Located in the cavity in the base beneath window 56 as shown in FIG. 2 already described is the so-called "color probe" 52. This probe includes, in the particular form illustrated, three separate photo-resistors 56, 58 and 60, all of which receive the mixed white light or modified white light that has passed through filter 134, the unknown or preselected referency color transparency, lens 26, diffuser 112 and window 56. When the color probe employs three separate photo-resistors as shown, each is covered by a different color filter, for example, resistor 56 by a red filter 138, resistor 58 by a green filter 140, and resistor 60 by a blue filter 142. Obviously, a simple photo-resistor could be used with three interchangeable filters.

In FIG. 6 it will be seen that these three filter-covered photo-resistors along with a fourth unfiltered photo-resistor 76 in the movable exposure probe 40 are selectively connectable by means of the previously-mentioned position selector switch 78 to the variable calibration resistors 68, 70, 72 and 74. The analyzer circuit of FIG. 6 is essentially a voltage division circuit across a power supply in which the voltage drop across selected photo and variable resistor pairs can be compared and matched in any preselected relationship so as to produce a visible signal in lamp 96. Thus, with switch contact 86 of selector switch 78 actuated, for example, the upper and lower halves of the voltage divider circuit would be completed through green-filtered photo-resistor 58 and variable resistor 70. The bulb 96 connected in series with current-limiting resistor 144 in the lower half of the voltage divider circuit and when the voltage across the latter reaches the firing potential of said bulb, it will turn on. Conversely, when the voltage across bulb 96 drops to its extinguishing voltage, it will turn off. Any any preset value of each calibration resistor there exists a corresponding value (voltage drop) across the photo-resistor paired therewith that will reduce the current flowing in the lower half of the circuit to that at which the bulb 96 extinguishes. This value in the photo-resistor is a repeatable one determined by the intensity of the light striking same; therefore, the circuit of FIG. 6 provides a means for comparing the color values in an unknown transparency as well as its comparative density with that of a preselected reference transparency that has been used to calibrate the variable resistors of the analyzer circuit. Proper use of the color analyzer and exposure analyzer of FIG. 6 in accordance with the procedure set forth in my copending application referred to previously or, alternatively, any one of several prior art exposure analyzers should provide the user with a set of ratios showing the comparative densities of the red, blue and green light transmitted by the unknown transparency as measured against the preselected reference transparency together with an overall exposure time required to produce an acceptable print at the selected lens aperture and degree of image magnification. Once these values are known, it becomes a simple matter to set the three timers 62, 64 and 66 in accordance therewith.

Figure 5:
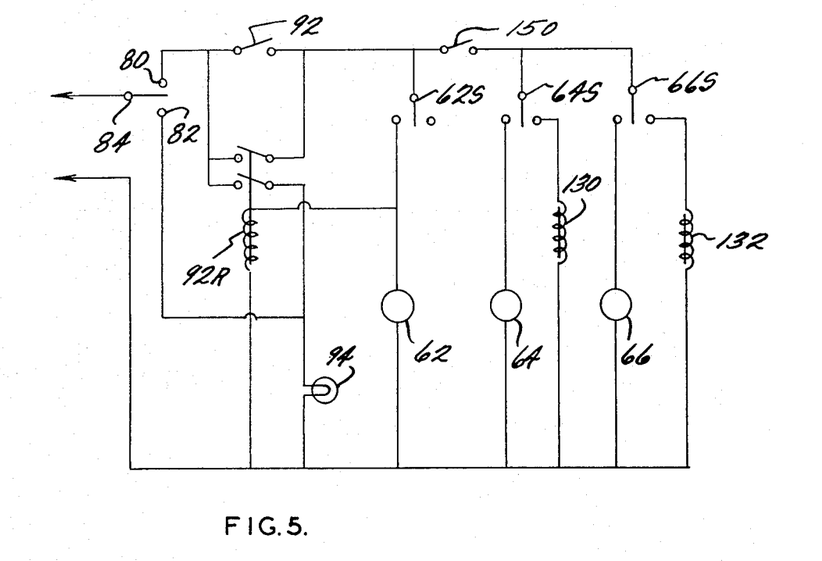
FIG. 5 is a schematic showing the control circuit employed to time the exposures and operate the filters and enlarger lamp; and, FIG. 6 is a schematic showing the color probe employed to compare the relative intensities of red, blue and green light passed by an unknown transparency with that transmitted by a preselected reference transparency and the exposure probe used to determine the overall exposure at a selected lens opening and degree of image magnification based upon a similar comparison.

Thus, we come to FIG. 5 and a detailed analysis of the timer circuit depicted schematically therein. The timers 62, 64 and 66 are of the manual reset type adapted to close a switch when the timer interval to which they are are set times out. The particular times depicted in the drawings are of a commercially-available type including single-pole double throw switches 62s, 64s and 66s, respectively. With the switch arm on the lefthand contact in the diagram, the timing mechanism associated therewith is set and running, whereas, when on the righthand contact, the timer has timed out.

Start switch 92 is of the normally-open momentary contact type adapted upon actuation to energize and close normally-open double-pole relay 92R associated therewith. As relay 92R closes, one set of its contacts close and hold around the start switch 91 while the other set light the enlarger lamp 94. As previously mentioned, function switch 84 is of the single-pole double-throw type which when thrown to its "FOCUS" contact 82 will by-pass the start switch 92, its relay 92R, all the timers and the solenoids 130 and 132 controlled thereby thus energizing the enlarger lamp 94 independently of the latter for focusing purposes. On the other hand, with function switch 84 thrown to its "TIME" contact 80, it will energize the rest of the timer circuit through start switch 92 and its relay.

One commercially-available form of timer suitable for use in the timer circuit of the present invention has a synchronous motor therein that turns a clutched shaft on which is mounted a cam that actuates the switch associated therewith. The switch is normally-biased onto the righthand or "END" contact in the diagram, however, when the shaft is manually rotated to preset the time interval, the cam shifts the switch arm over onto the lefthand or "RUN" contact where it remains until the timer times out. When the time interval elapses, the cam releases the switch to return to its "END" contact.

Now, the "END" contacts of two of the timers are connected in series with the coils of the solenoids 130 and 132 while the "END" contact of the third timer is "dead". If we assume as has been done previously that the red exposure interval is the longest of the three, then the "END" contact of the red timer 62 will be the dead one while the corresponding contact of green timer 64 will be connected in series with green solenoids 130 and the one on blue timer 66 will be connected to blue solenoids 132.

Before providing with a detailed look at the method of using the previously-described apparatus, it might be good to point out certain rather obvious substitutions that could be made therein without the exercise of invention. First of all, while the apparatus shown includes three separate clock-type mechanical timers each operating independently of the others, a single timing mechanism could easily be substituted therefor provided it includes means for simultaneously timing three separate events, namely, the red, blue and green exposures. To do this electronically is quite simple using a series of stepping switches and one can choose any number of discreet time intervals by merely selecting the appropriate contacts from the whole series thereof. Mechanically, it is just as simple to employ a single common drive operating three different timer mechanisms simultaneously, each of which can be set independently of the others. Thus, when the red, blue and green time intervals are referred to herein as being timed by separate timers, such term is intended to encompass any apparatus, whether mechanical, electrical or otherwise, capable of simultaneously timing three or more separate events.

Along this same line, the preferred embodiment of the invention shown and described herein has only two filters instead of three. As already noted, this has certain advantages in terms of simplification of both the apparatus, timing and control circuitry; however, one could, without the exercise of invention, add the third filter along with the circuitry necessary to control same. Actually all this does is add the capability of permitting any one of the three exposures to be the longest when, actually, such versatility is seldom, if ever, needed so long as the user sticks with a certain type of enlarger lamp and positive print-making material. It is important to note in this connection that a three-filter version still only uses two of the three filters because the lamp has already extinguished at the point where the third filter in the succession thereof moves into position under the lens. Thus, only two of the three filters are operative anyway to influence the exposures and the third is surplusage although its hue could, conceivably, be differen from one print to the next.

In operation, the magenta and yellow filters 116 and 118, respectively, will have been pushed back manually into their retracted positions where they will be held by magnets 124. At this point we will assume that the unknown transparency has been analyzed in some fashion, such as by means of the exposure analyzation apparatus and technique forming the subject matter of my copenidng application, and such analysis has determined an overall exposure time required to produce a satisfactory print as well as the relative red, green and blue exposures needed to reproduce the same color balance present in a print made from a preselected reference transparency. For purposes of the present discussion, we will assume that with the enlarger head set at the desired degree of image magnification, a 45 second exposure at an enlarging lens aperture of $f$ 8.0 will produce a print having approximately the same tonal values and density as the print made from the preselected reference transparency. We will assume that to reproduce the same color balance present in the print made from the preselected reference transparency, a red exposure one and one-half times that of the green exposure and a green exposure three times that of the blue will be needed. Since the red exposure will be the longest of the three, it will be equated to the previously chosen overall exposure time of 45 seconds and the green and blue exposures adjusted accordingly. This, of course, results in a 30 second green exposure and a ten second blue one.

The red, blue and green timers are set in accordance with these predetermined values and, with the positive print paper in place in an easel in the baseboard, the operator sets the function selector switch to "TIME" contact 80 and momentarily actuates start switch 92. All three timers start running simultaneously. At the end of 10 seconds, the blue timer 66 will time out causing the switch arm of switch 66s to move over to its "END" contact thus energizing the coil of blue solenoids 132. When the latter energizes, its armature will extend and engage the yellow filter 118 pushing it away from magnet 124 a distance such that spring 120 will take over and pull it into the light thus terminating the blue exposure. 20 seconds later after a total elapsed time of 30 seconds, the green timer will time out actuating solenoid 130 in the same manner to extend the magenta filter 116 and terminate the green exposure. Finally after a total elapsed time of 45 seconds during the last 15 seconds of which the yellow and magenta filters are cooperating to block all but the red light, the red timer will time out and shut off the enlarger lamp 94. As switch 62s returns to its "END" contact, the coil 92R of the start switch relay is also deenergized due to the opening of its "RUN" contact thus reopening start switch 92.

Finally, it will be noted that a mode selector switch 150 has been placed between the red and green timers. When this switch is opened, the green and blue solenoids 130 and 132 will be rendered inoperative so that the filters 116 and 118 will stay in retracted position against their magnets. This enables the apparatus to be used for black-and-white work when the red timer 62 is used to time the exposures.

What is claimed is:

1. Apparatus for making color enlargements from a color transparency which comprises: a lamp housing containing a source of illumination mounted for relative movement toward and away from an upwardly-facing supporting surface; lens means mounted on the underside of the lamp housing for movement therewith, said means being adapted to transmit a focused full-color reproduction of the image on a transparency placed thereabove on a supporting surface therebeneath; first and second filter means mounted for independent movement from a retracted inoperative position to an extended operative position either above or below the lens means, said first filter means being of a hue effective to block whichever color of red, blue or green light known to require the shortest exposure time of the three in accordance with a predetermined analysis of the transparency, and said second filter means being of a hue effective to block whichever one of the remaining two colors of the aforesaid three colors that was predetermined to require the second shortest exposure; first, second and third adjustable timing means adapted to separately and simultaneously time one of the red, blue or green exposures; first and second filter actuating means connected to the first and second filter means operative upon actuation to extend same indepedently of one another; a first timing circuit interconnecting the first timing means and first filter actuating means operative upon actuation to extend the first filter means and terminate the shortest of the three exposures following the lapse of the preset exposure time therefor; a second timing circuit interconnecting the second timing means and the second filter actuating means operative upon actuating to extend the second filter means and terminate the second shortest exposure of the three upon the lapse of the preset exposure time therefor; a third timing circuit interconnecting the third timing means and the source of illumination operative upon actuation to extinguish the latter upon the lapse of the preset exposure time corresponding to the longest of the three exposures; and, control means connected to the source of illumination and to the first, second and third timing circuits operative upon actuation in a first position to simultaneously actuate same.

2. The apparatus for making color enlargements as set forth in claim 1 in which: the lens means includes an adjustable diaphragm operative upon actuation to vary the intensity of the light transmitted thereby; and, in which color analysis means of the type adapted to compare the relative intensities of the red, blue and green light transmitted by an unknown transparency with that transmitted by a preselected reference transparency is positioned in the path of the light transmitted by the lens means, said analysis means and lens means cooperating with one another upon adjustment of the diaphragm in the latter to define a ratio of exposure times for the unknown transparency corresponding to those of the preselected reference transparency known to reproduce the color balance found therein.

3. The apparatus for making color enlargements as set forth in claim 1 in which: the lens includes an adjustable diaphragm operative upon actuation to vary the intensity of the light transmitted thereby; and, in which an exposure analysis means for the type adapted to compare the intensity of the light transmitted by an unknown transparency at a selected degree of image magnification with that transmitted by a preselected reference transparency when making an acceptable print in a known exposure time is placed in the path of the light transmitted by the lens means, said analysis means and lens means cooperating with one another upon adjustment of the diaphragm in the latter to define an equivalent set of conditions for producing an acceptable print from the unknown transparency.

4. The apparatus for making color enlargements as set forth in claim 1 in which: a transparent filter of a hue effective to attenuate red or green or blue light is interposed in the light path, said filter being of a density adapted to insure that the exposure time of the colored light it attenuates will be the longest of the three.

5. The apparatus for making color enlargements as set forth in claim 1 in which: the control means includes a second position operative to actuate the source of illumination while leaving the first, second and third timing means deactuated.

6. The apparatus for making color enlargements as set forth in claim 1 in which: the first, second and third timing circuits are connected in parallel with one another; and, in which switch means operative in open position to disconnect the second and third timing circuits from the first is interposed therebetween.

7. The apparatus for making color enlargements as set forth in claim 1 in which: the first and second filter means are mounted one above the other in superimposed relation for independent movement between their extended and retracted positions; first and second latch means operative to releasably hold the first and second filters in retracted position are located adjacent thereto; and, in which the first and second filter actuating means operate upon actuation to release the filters associated therewith from the latch means.

8. The apparatus for making color enlargements as set forth in claim 2 in which: a base with an upwardly-facing supporting surface is positioned beneath the lamp housing, said supporting surface having a transparent window therein and a cavity beneath said window; and, in which the color analysis means is located in the cavity beneath the window.

9. The apparatus for making color enlargements as set forth in claim 2 in which: a diffusion filter is mounted for movement from a retracted inoperative position into an extended operative position adapted to diffuse the pro-jected image falling on the color analysis means.

10. The apparatus for making color enlargements as set forth in claim 3 in which: the exposure analysis means is movable relative to the projected image.

11. The apparatus for making enlargements as set forth in claim 7 in which; spring means are connected to the first and second filter means normally biasing same into extended position; the latch means comprises permanent magnets adapted to hold the first and second filter means in retracted position in opposition to the bias exerted thereon by the spring means; and, in which the first and second filter actuating means comprise solenoids connected to the first and second filter means operative upon actuation to relrease same from the pull exerted thereon by the magnets to a degree where the spring means will overcome the latter and bias them into extended position.

12. The apparatus for determining the red, green and blue light exposure intervals effective to reproduce the same color balance in a color print made from an unknown transparency as are present in a color print made from a preselected reference transparency which comprises: a lamp housing containing a source of illumination; lens means carried by said lamp housing having an adjustable diaphragm and a scale associated therewith calibrated to indicate the intensity of the light passing therethrough; and, color analysis means of the type capable of matching the intensities of red, blue and green light transmitted by an unknown transparency with that transmitted by a preselected reference transparency in accordance with a predetermined relationship, said color analyzer means cooperating with said lens means upon adjustment of the diaphragm in the latter to define a ratio of exposure values capable of reproducing the color valance in said reference transparency.

13. The apparatus of claim 12 which includes: diffusion means positionable between the color analysis means and transparency adapted to diffuse the image reproduced of the latter.

14. The method of producing a color print from an unknown transparency so as to substantially reproduce same which comprises the steps of: passing white light through the unknown transparency to produce a full-color projected image thereof; diffusing the full-color image to produce a full-color diffused image, selectively filtering the diffused image so as to separate same into its red, blue and green components; adjusting the intensities of each component so as to match those of a preselected reference transparency in accordance with a predetermined relationship; establishing a ratio of component intensities for the known transparency that matches those of the reference transparency and converting same to a ratio of component exposure values; adjusting the degree of magnification of the undiffused full-color image to that of the final print; comparing the intensity of the full-color image thus magnified with the total exposure time for the reference transparency and determining a total exposure time for the unknown transparency corresponding thereto; equating the exposure time of the color component requiring the longest exposure to said predetermined total exposure time for the magnified full-color image of the unknown transparency; selecting exposure times for the two remaining color components that bear the same relationship to one another and to the time chosen for the third as exists in the predetermined ratio of their exposure values; exposing the print to the magnified undiffused image projected in full color through the unknown transparency for a time interval corresponding to the shortest of the predetermined exposure times for the three colors; selectively filtering out the color component requiring the shortest exposure time for the balance of the total exposure time commencing at the conclusion of the shortest of the predetermined exposure times; selectively filtering out the color component requiring the next shortest exposure time for the balance of the total exposure time commencing at the conclusion of the next longer of the predetermined exposure times; and, extinguishing the white light at the conclusion of the total predetermined exposure time.

* * * * *